July 11, 1950
R. H. HAGEN
2,514,390
INJECTION MOLDING DEVICE
Filed Nov. 21, 1945
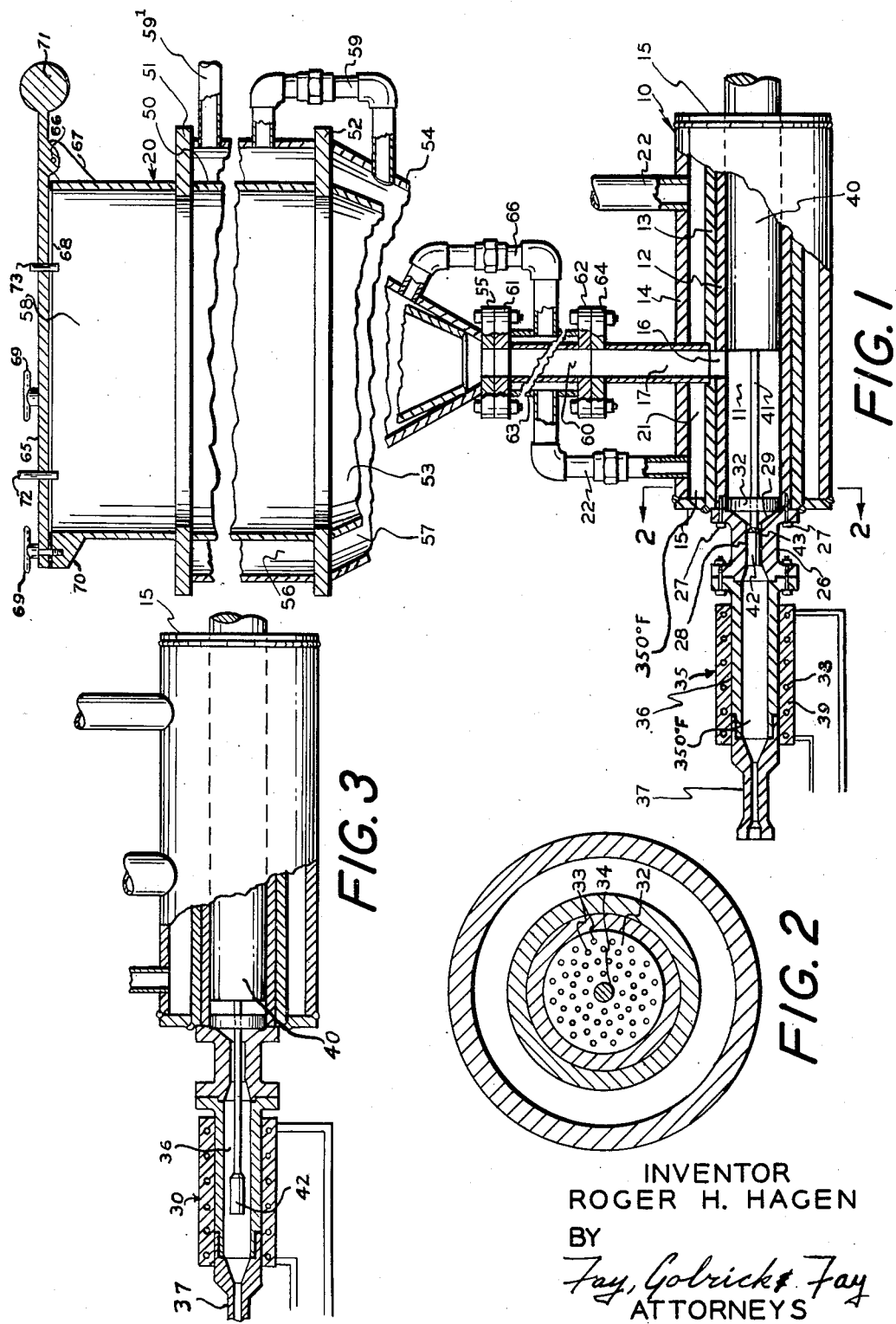
INVENTOR
ROGER H. HAGEN
BY
*Fay, Golrick & Fay*
ATTORNEYS Patented July 11, 1950

2,514,390

UNITED STATES PATENT OFFICE 2,514,390

INJECTION MOLDING DEVICE

Roger H. Hagen, Plymouth, Wis., assignor, by mesne assignments, to Plymouth Industrial Products, Inc., Plymouth, Wis., a corporation of Wisconsin Application November 21, 1945, Serial No. 630,083

4 Claims. (Cl. 18—30)

The present invention relates to a new apparatus for molding thermo-plastic material.

Heretofore, it has been the practice in molding thermo-plastic material, to insert a measured amount of dry, granulated material into a cylinder, then heating the material to its fusion temperature and ejecting it from the cylinder into a mold. This process is relatively slow because thermo-plastic material is a poor heat conductor and it requires considerable B. t. u.'s for fusion thereof. Also, the amount of material that can be molded in one operation is limited, due to the impracticability of fusing a relatively large mass in the ejection cylinder.

An object of the present invention therefore, is to provide an apparatus for molding thermo-plastic material in a much more rapid and efficient manner than heretofore. In carrying out the invention, I propose to preheat a relatively large mass of thermo-plastic material to its fused and flowing state prior to its introduction into the ejection chamber and to feed material from this mass into the ejection chamber so that a predetermined, measured charge of the plastic material for each molding operation may be had and a relatively large charge of material may be rapidly molded with a minimum of heat expenditure.

Another object of the invention is to provide an apparatus for molding thermo-plastic material in which material in a fluid condition is fed into an ejection cylinder, the outlet of the cylinder being closed by a valve during the charging of the cylinder and which valve is retained closed until after the inlet of the cylinder is closed, whereby a measured charge is obtained in the cylinder.

A still further object of the invention is to provide a molding apparatus in which the ejection nozzle of the apparatus is closed by a valve during charging of the ejection cylinder to prevent leakage of fluid material from the nozzle prior to the molding operation.

A still further object of the invention is to provide a member for clearing the nozzle of the ejecting device of hardened material prior to each molding operation, which member is preferably actuated by the ram that ejects the plastic material from the ejection cylinder.

Other objects and advantages of the invention will be apparent from the following description of a preferred embodiment of the invention, reference being had to the accompanying drawings wherein:

Fig. 1 is a view, partly in section of an apparatus for ejecting thermo-plastic material into a mold;

Fig. 2 is a view taken on line 2—2 of Fig. 1, but on a larger scale; and

Fig. 3 is a view showing the ejection mechanism shown in Fig. 1, but certain parts thereof are in different positions.

Referring to the drawings, I have shown an apparatus for molding thermo-plastic material in accordance with the invention. The apparatus comprises in general a cylindrical ejector chamber which includes an inlet in one side thereof through which the thermo-plastic material is received in a fluid form, and a ram is provided in the chamber for forcing this material through an outlet at one end of the chamber and through a nozzle into a mold. The thermo-plastic material, prior to being fed to the chamber, is stored in a hopper, the walls of which hopper are maintained heated so that the thermo-plastic material will enter the ejector chamber in a fluid condition. One of the features of the invention is the provision of a valve associated with the ejector ram whereby the outlet of the chamber is retained closed until the inlet of the chamber is closed off by the ram. This provides a definitely measured charge of thermoplastic material for each molding stroke of the ram.

Another feature of the apparatus is that prior to actual ejection of material from the chamber, the force of the ram is utilized to clear the nozzle outlet of hardened thermo-plastic material.

Referring now more particularly to the drawings, the apparatus includes an ejector, indicated generally at 10. The ejector comprises a chamber 11 formed by a tubular sleeve 12 that is fitted within a second sleeve 13, the metal of sleeve 12 being of a type particularly suitable for bearing the reciprocation of a ram therein and to withstand pressure. A third sleeve 14 surrounds the sleeves 12 and 13 and is spaced therefrom by end rings 15. The sleeves 12 and 13 each have an aligned opening 16 therein which form an inlet in the side of the chamber 11. A tube 17 is connected with the opening 16 and extends through an opening in the sleeve 14 upwardly to a hopper, indicated generally at 20. The sleeve 14 surrounding the sleeves 12 and 13 forms a jacket 21 surrounding the latter sleeves, and hot oil is adapted to be circulated through the jacket 21 by inlet and outlet pipes 22 and 23, respectively. The source of hot oil is not shown, but any suitable oil heating device may be employed which maintains the temperature of the oil at that required in the chamber 11 to maintain fluidity of the thermo-plastic material to be fed to the chamber. This temperature may be 400° F., for example.

An outlet member 26 is securely bolted over the end of the sleeve 12 by bolts 27, and the member 26 has a bore 28 which forms a restricted outlet from the chamber 11. Preferably, the walls of the member 26 leading to the right-hand end of the bore 28 are tapered as shown at 29 for facilitating the feeding of the material to the bore.

Preferably, a perforated disk 32 is press fitted in the end of member 26, which disk has a plurality of openings 33 formed therein and a central opening 34, the purpose of which openings will appear hereinafter.

A tubular nozzle member 36 is bolted over the left-hand end of member 26, and the outer end of the tubular member 36 is under cut for receiving a nozzle 37. The nozzle 37 is adapted to connect the tubular member 36 with a particular mold, not shown, and other nozzles similar to nozzle 37, but adapted to cooperate with different types of molds, may be readily substituted for the nozzle 37. A sleeve-like heating element 35 surrounds the member 36 for maintaining the temperature within the sleeve at approximately the temperature inside chamber 11. The heating element is shown to comprise an electrical resistance wire 38 embedded in a ceramic material 39, although any other suitable heating means could be employed, if desired.

A ram 40 is adapted to reciprocate in the chamber 11, and the ram closely fits into the sleeve 12 so that the fluid thermo-plastic material will not enter between the ram and the sleeve. The ram 40 may be reciprocated by any suitable mechanism, not shown, and it may comprise an hydraulically operated piston. A valve rod 41 is connected to the end of the ram 40 in any suitable manner, such as by threading the end of the rod into the ram, and the opposite end of the rod 41 has an enlarged cylindrical valve member 42 formed thereon. The rod 41 extends through and is supported in central opening 34 of the disk 32 and the valve member 42 is adapted to slide in the bore 28. The valve member 42 is adapted to completely close the bore 28 to prevent escape of thermo-plastic material therethrough, as will be more fully described hereinafter. Preferably the end of the valve member adjacent the rod 41 is tapered as at 43 so that the valve will be guided into the bore 28 when the ram is moved from the position shown in Fig. 3 to the position shown in Fig. 1. It is to be noted that the dimensions of the rod 41, valve member 42 and bore 28 are such that when the end of the ram 40 is out of alignment with the inlet opening 16 to the chamber 11 so that material may be fed to the chamber, the valve member 42 closes the outlet bore 28 and the valve will maintain the bore 28 closed during the time the end of the ram 40 moves across the opening 16 and will cause opening of the bore 28 just as the ram closes off the inlet opening 16. The purpose of this arrangement will appear hereinafter.

Referring now to the hopper 20, the hopper is formed of an inner cylindrical member 49 welded at the top to an annular ring 50 and welded at the bottom to a similar ring 51 to form a liquid seal therebetween. Outer cylinder 52 is similarly welded to rings 50 and 51. An inverted cone-shaped member 53, having the larger end thereof similarly welded to the ring 51 and in alignment with the tubular member 49 is disposed beneath the member 49 and is surrounded by a similarly shaped member 54. The members 53 and 54 engage one another at the restricted ends thereof and are welded together at that point to form a liquid seal. The lower end of member 54 is welded to a collar 55. Thus, two jackets 56 and 57 are formed about the inner container formed by the members 49 and 53, which jackets are adapted to receive hot oil, as will be described. Preferably, a cylindrical rim 58 is welded to the ring 50, which rim is in alignment with the upper edges of the cylindrical member 49.

Preferably the hopper 20 is adapted to hold one-half ton of thermo-plastic material, for example, and it may be located above the ejector 10 in the floor of the building above the floor on which the ejector is located. In order to maintain the thermo-plastic material in a heated condition, I prefer to provide a jacketed tube 60 for interconnecting the outlet of the hopper with the inlet tube 17. The tube 60 is welded at the opposite ends to collars 61 and 62 and is located concentrically within a tube 63 which is likewise welded to the collars 61 and 62. The collar 61 is bolted to collar 55 and collar 62 is bolted to collar 64 which is welded to the top of tube 17. Hot oil is circulated between the tubes 60 and 63 by pipe 23, being connected in an opening in the lower part of tube 63, and a pipe 66 is connected with the interior of tube 63 adjacent to the top thereof, which pipe 66 leads to the lower portion of the hopper 20 and is connected in an opening in the cone member 54.

The ejector 10, the hopper 20 and the intermediate feeding tube 60 are maintained heated by oil flowing from the oil supply through pipe 22, through jacket 21, out pipe 23 and into the jacket surrounding the tube 60, through pipe 66 intermediate the conical members 53 and 54, through pipes 59 to the jacket between members 49 and 50 and thence from the latter jacket through a pipe 59' to the oil heater.

In order to insure feeding of the thermoplastic material to the chamber 11, air under pressure of approximately 100 lbs. per square inch is maintained over the material in the hopper. This is accomplished by providing a lid 65 that is hinged on a pin 66 journalled in a yoke lug 67 formed on the hopper. A gasket 68 is interposed between the lid and the top edge of the hopper. Screw-down bolts 69 extend through openings near the periphery of the lid and are threaded into securing lugs 70 formed on the hopper for clamping the lid to the hopper. Preferably, the lid is counterweighted as at 71. An air inlet tube 72 extends through an opening through the lid and the edges of the tube are hermetically sealed with the walls of the opening. The tube 72 is connected with a suitable source of air under pressure by a flexible tube, not shown. If desired, a safety valve 73 may be provided.

In practicing the invention, I prefer to compound the thermo-plastic material, one form of which may include ground asbestos and a bituminous or tar-like substance and which is freely flowable at a temperature of 400° F., and to place the compound material into the hopper 20 before the material has cooled from the compounding temperature to below the boiling point of water so that there is no necessity of reheating the material after it has been compounded in order to expel moisture therefrom and to mold the same. A half ton or more of this material, for example, may be placed in the hopper 20 at one time. The ram 40 is moved to the right-hand position shown in Fig. 1 and the thermo-setting material will flow into the chamber 11 through opening 16. Preferably, the air pressure in the hopper is 100 pounds per square inch. The valve member 42 will be in the position for closing bore 28 so that the liquified thermo-plastic material will not escape from the chamber 11. When the available space in the chamber 11 is filled with thermo-plastic material the ram 40 is actuated toward the left and the inlet opening 16 to chamber 11 will be closed by the ram, and at the instant the inlet is closed valve member 42 opens the bore 28 and the material within the chamber 11 will be ejected through the bore 28 and into the nozzle member 36, from whence it passes from the nozzle 37 and into a suitable mold, not shown. It will be noted that the thermo-plastic material passes through the openings 33 in the disk 32 and that the openings 33 are preferably approximately the same size or smaller than the diameter of the opening through the nozzle 37 so that any fibrous constituents of the thermo-plastic material forming a nodule which might plug up the nozzle 37 is caught in one of the openings 33. Thus the disk 33 serves as a screen, and when it becomes clogged the member 26 may be easily removed and the disk 32 cleaned of the clogging material and replaced. As the ram 40 moves from left to right, or from the position shown in Fig. 3 to the position shown in Fig. 1, valve member 42 closes bore 28 just as the ram 40 commences to open the inlet 16 to the chamber 11. Thermo-plastic material then rushes in to fill chamber 11 and valve 42 effectively prevents the escape of any thermo-plastic material into the nozzle 36, thereby preventing the thermo-plastic material from flowing through nozzle 37 prematurely.

During substantially each molding operation, a sprue solidifies in the end of the nozzle 37. With certain types of thermo-plastic material the tensile strength is relatively low and the sprue breaks in the nozzle when the mold is separated from the nozzle. The sprue formed in nozzle 37 seals the latter and on the initial movement of the ram 40 of the next molding operation, the valve member acts as a ram and transmits pressure through the fluid thermo-plastic in the member 36 to force the sprue from the nozzle. Since the opening 16 is not closed during the initial movement of the ram 40 a relatively small amount of pressure will be present against the ram from the thermo-plastic material in the chamber 11 as the material may escape upwardly into the pipe 17 so that practically the entire force on the ram is available for clearing the nozzle 37 prior to each ejection operation.

By my invention there is a substantial saving by eliminating the reheating of the thermo-plastic material in the ejecting apparatus, and by feeding the thermo-plastic material to the ejecting apparatus in a fluid condition a much larger amount of material may be ejected during one operating cycle. For example, as much as three pounds of material may be ejected during each ejecting operation. By providing the valve arrangement 42, a measured amount of the molding material may be charged into the ejecting chamber 11 and, also, the sprues formed in the nozzle are quickly and efficiently removed.

Although I have discovered but one form of the invention it is to be understood that other forms may be adopted, all falling within the scope of the claims which follow.

I claim:

1. An injection mold apparatus comprising, means forming a chamber for receiving molding material; an elongated nozzle structure associated with the chamber and connected at one end with the latter through a passageway; a ram reciprocable in said chamber for forcing the molding material from the chamber and into the nozzle structure through the passageway; a rod rigidly connected with the ram and extendable freely through the passageway when the ram is reciprocated; and a piston member carried on the rod and being arranged to be drawn within the passageway when the ram is at the end of its intake stroke and to be moved into the nozzle structure when the ram is moved in its ejection stroke, the diameter of said piston being the same as that of the passageway and substantially less than the diameter of the interior of the nozzle structure whereby the passageway may be closed by the piston when the latter is in the passageway and material may flow about the piston when the latter is in said nozzle structure.

2. An injection mold apparatus comprising, means forming a chamber for receiving molding material; an elongated nozzle structure associated with the chamber and connected at one end with the latter through a cylindrical passageway; a ram reciprocable in said chamber for forcing the molding material from the chamber and into the nozzle structure through the passageway; a rod rigidly attached to the ram and extendable freely through the passageway; and a piston type valve member rigidly attached to the rod and being arranged to be drawn within the passageway when the ram is at the end of its intake stroke and to be moved into the nozzle structure when the ram is moved in its ejection stroke, the diameter of said valve member being the same as that of the passageway and substantially less than the diameter of the interior of the nozzle structure whereby the passageway may be closed by the valve member when the latter is in the passageway and material may flow about the valve member when the latter is in said nozzle structure.

3. An injection mold apparatus comprising, means forming a chamber for receiving molding material; an elongated nozzle structure associated with the chamber and connected at one end with the latter through a relatively extended cylindrical passageway, said nozzle structure having a restricted outlet; a ram reciprocable in said chamber for forcing the molding material from the chamber and into the nozzle structure through the passageway; a rod rigidly connected with the ram and extendable freely through the passageway; and a piston member carried by the rod and being arranged to be drawn within the passageway when the ram is at the end of its intake stroke and to be moved into the nozzle structure when the ram is moved in its ejection stroke, the diameter of said piston being the same as that of the passageway and substantially less than the diameter of the interior of the nozzle structure whereby the passageway may be closed by the piston when the latter is in the passageway and material may flow about the piston when the latter is in said nozzle structure, and said piston member being of such length that it blocks the passageway during an appreciable portion of the ejection stroke for creating a substantial hydraulic force at the restricted outlet of the nozzle structure upon initiation of the ejection stroke of the ram.

4. An injection mold apparatus comprising, means forming a chamber for receiving molding material; an elongated nozzle structure associated with the chamber and connected at one end with the latter through a passageway; a ram reciprocable in said chamber for forcing the molding material from the chamber and into the nozzle structure through the passageway; a rod rigidly connected with the ram and extendable freely through the passageway; a perforated strainer member positioned in the chamber, said member having an opening therethrough in alignment with said passageway and being adapted to receive the rod therethrough and forming a guide for the rod; and a valve member rigidly attached to the rod and being arranged to be drawn within the passageway when the ram is at the end of its intake stroke and to be moved into the nozzle structure when the ram is moved in its ejection stroke, the diameter of said valve member being the same as that of the passageway and substantially less than the diameter of the interior of the nozzle structure whereby the passageway may be closed by the valve member when the latter is in the passageway and material may flow about the valve member when the latter is in said nozzle structure.

ROGER H. HAGEN.

REFERENCES CITED

The following references are of record in the file of this patent:

UNITED STATES PATENTS

| Number | Name | Date |
| --- | --- | --- |
| 698,596 | Veeder | Apr. 29, 1902 |
| 861,431 | Brown et al. | June 30, 1907 |
| 1,174,049 | Brand et al. | Mar. 7, 1916 |
| 2,035,801 | Gastrow | Mar. 31, 1936 |
| 2,107,190 | Shaw | Feb. 1, 1938 |
| 2,207,426 | Bailey | July 9, 1940 |
| 2,269,953 | Morin et al. | Jan. 13, 1942 |
| 2,345,917 | Coffman | Apr. 4, 1944 |

FOREIGN PATENTS

| Number | Country | Date |
| --- | --- | --- |
| 284,295 | Germany | May 19, 1915 |